United States Patent
Narita

(10) Patent No.: US 10,250,040 B2
(45) Date of Patent: *Apr. 2, 2019

(54) DISTRIBUTING POWER BETWEEN DATA CENTERS

(71) Applicant: International Business Machines Corporation, Armonk, NY (US)

(72) Inventor: Izuru Narita, Kamakura (JP)

(73) Assignee: International Business Machines Corporation, Armonk, NY (US)

( * ) Notice: Subject to any disclaimer, the term of this patent is extended or adjusted under 35 U.S.C. 154(b) by 60 days.

This patent is subject to a terminal disclaimer.

(21) Appl. No.: 15/390,368

(22) Filed: Dec. 23, 2016

(65) Prior Publication Data

US 2017/0110881 A1 Apr. 20, 2017

Related U.S. Application Data

(63) Continuation of application No. 14/619,394, filed on Feb. 11, 2015, now Pat. No. 9,871,408.

(30) Foreign Application Priority Data

Mar. 26, 2014 (JP) .................................. 2014-064898

(51) Int. Cl.
*H02J 3/38* (2006.01)
*H02J 9/06* (2006.01)
(Continued)

(52) U.S. Cl.
CPC ............ *H02J 3/382* (2013.01); *G06F 1/3212* (2013.01); *G06F 9/5094* (2013.01); *H02J 3/386* (2013.01);
(Continued)

(58) Field of Classification Search
CPC .......... H02J 3/382–3/386; G06F 1/32–1/3296; Y02B 70/30–70/346
See application file for complete search history.

(56) References Cited

U.S. PATENT DOCUMENTS

2012/0130556 A1* 5/2012 Marhoefer ................ H02J 3/32
700/291
2012/0277923 A1* 11/2012 Tsuchiya ............. B60L 11/1862
700/291
(Continued)

FOREIGN PATENT DOCUMENTS

JP  2008086109 A  4/2008
JP  2012058837 A  3/2012
(Continued)

OTHER PUBLICATIONS

H. Kanchev, D. Liu, F. Colas, V. Lazarov, B. Francois, "Energy management and operational planning of a microgrid with a pv-based active generator for smart grid applications", Feb. 28, 2011, IEEE, IEEE Transactions on Industrial Electronics, vol. 58, Issue 10.*
(Continued)

*Primary Examiner* — Rexford Barnie
*Assistant Examiner* — David Shiao
(74) *Attorney, Agent, or Firm* — Kelsey M. Skodje

(57) ABSTRACT

A data center operable using only electric power based on renewable energy. The data center includes at least one device driven by the electric power, a storage battery for storing the electric power, and a controller for switching the operating mode of the device over the course of time on the basis of predicted values for the amount of electric power generated using renewable energy, the amount of electric power stored in the storage battery, and the amount of electric power consumed by the device.

5 Claims, 5 Drawing Sheets

(51) Int. Cl.
*H02J 7/35* (2006.01)
*G06F 1/3212* (2019.01)
*G06F 9/50* (2006.01)
*H02J 7/00* (2006.01)
*H02J 3/00* (2006.01)

(52) U.S. Cl.
CPC .............. *H02J 7/0052* (2013.01); *H02J 7/35* (2013.01); *H02J 9/061* (2013.01); *H02J 2003/003* (2013.01); *Y02B 10/72* (2013.01); *Y02B 70/126* (2013.01); *Y02D 10/174* (2018.01); *Y10T 307/625* (2015.04)

(56) References Cited

U.S. PATENT DOCUMENTS

| | | | | |
|---|---|---|---|---|
| 2013/0049468 A1* | 2/2013 | Iwasaki | ...................... | H02J 7/35 307/48 |
| 2014/0042811 A1* | 2/2014 | Myamoto | ............... | H02J 3/383 307/31 |
| 2014/0049886 A1 | 2/2014 | Lee et al. | | |
| 2014/0172182 A1* | 6/2014 | Subbotin | ................. | H02J 3/383 700/291 |
| 2014/0361732 A1 | 12/2014 | Nishikawa et al. | | |
| 2015/0077063 A1* | 3/2015 | Tsukamoto | ............. | H02S 50/00 320/134 |

FOREIGN PATENT DOCUMENTS

| | | | |
|---|---|---|---|
| JP | 2012228043 A | 11/2012 |
| WO | 2013003357 A2 | 1/2013 |
| WO | 2013033217 A1 | 3/2013 |
| WO | 2013/128985 A1 | 9/2013 |

OTHER PUBLICATIONS

R.K. Akikur, R. Saidur, H.W. Ping, K.R. Ullah, "Comparative study of stand-alone and hybrid solar energy systems suitable for off-grid rural electrification: A review", Nov. 2013, Renewable and Sustainable Energy Reviews 27 (2013), pp. 738-752.*

Narita, "Distributing Power Between Data Centers," U.S. Appl. No. 15/847,355, filed Dec. 19, 2017.

Toko OA System Co., Ltd., Solar Data Center by Photovoltaic Energy, The Japan's First Non-Stop Data Center, "The Second Power Plant is Completed; Non-Power Failure ECO Server Rental Start; What is Japan's first Solar Data Center?", http://www.solar24-365.com/index.html, Accessed on Jan. 21, 2015, 5 pages.

Apple.com, Environmental Responsibility, "We Want to Leave the World Better Than We Found It; We Have a Big Responsibility to Leave a Smaller Footprint," http://apple.com/environment, Accessed on Jan. 21, 2015, 5 pages.

Mell et al., "The NIST Definition of Cloud Computing," Version 15, Oct. 7, 2009, 2 pages, National Institute of Standards and Technology.

Narita, I., "Data Center and Method for Distributing Load Between Data Centers," JP Patent Application 2014-064898, filed Mar. 26, 2014.

Decision to Grant a Patent, JP Patent Application No. 2014-064898, dated Aug. 12, 2016.

Narita, I., "Distributing Power Between Data Centers," U.S. Appl. No. 14/619,394, filed Feb. 11, 2015.

Notification of Reasons for Refusal, JP Patent Application No. 2014-064898, dated Apr. 28, 2016, 4 pages.

* cited by examiner

DISTRIBUTING POWER BETWEEN DATA CENTERS

BACKGROUND

The present invention relates to a data center and, more specifically, to a method for distributing a load between data centers that are operable using only electric power based on renewable energy.

When a data center is operated using electric power generated from renewable energy such as wind power or solar power, the supply of electric power to the data center is not always stable. Therefore, hardly any data centers rely exclusively on renewable energy at the present time. For example, some data centers use some power generated photovoltaically but draw the remaining demand from ordinary transmission lines. In other words, data centers currently cannot operate exclusively on electric power based on renewable energy.

There are examples of data centers drawing all of their electric power from photovoltaic cells but, in order to provide a constant supply of photovoltaically generated electric power to a data center given the instability of available sunlight, a large (excess) number of solar panels and storage batteries is required, which makes installation costs higher than they would otherwise be. When considering the installation of a data center in a location without transmission lines, there is concern over the inability to supply electric power to the data center from the grid in an emergency.

A terminal device/information processing system is disclosed in laid-open patent publication JP2012-058837 to O. Atsushi, titled "Terminal Device, Information Processing System, Request Destination Selection Method, and Program" which includes a selection unit for selecting an external device connected to a processing unit or connecting unit as the device to process a given request depending upon the circumstances, a power storage unit for storing electric power used to operate the processing unit, and a power level detecting unit for detecting the amount of electric power stored in the power storage unit. In this system, the selection unit selects an external device connected via a connecting unit when the power level detected by the power level detecting unit has fallen below a predetermined value. However, the invention disclosed in JP2012-058837 does not relate to a data center or to a method for distributing the load between data centers operable using only electric power based on renewable energy.

SUMMARY

Therefore, it is an object of the present invention to enable the steady execution of jobs to be processed while predicting the amount of electric power being supplied to data centers operable using only electric power based on renewable energy. It is another object of the present invention to properly share and stably execute jobs to be processed between data centers while predicting the amount of electric power being supplied to each data center.

One aspect of the present invention is a data center operable using only electric power based on renewable energy. This data center includes: at least one device driven by the electric power; a storage battery for storing the electric power; and a controller for switching the operating mode of the device over the course of time on the basis of predicted values for the amount of electric power generated using renewable energy, the amount of electric power stored in the storage battery, and the amount of electric power consumed by the device.

Because, in an aspect of the present invention, the operating mode of the device is switched over the course of time on the basis of predicted values for the amount of electric power generated using renewable energy, the amount of electric power stored in the storage battery, and the amount of electric power consumed by the device, operation of the device is able to remain stable relative to changes in the amount of electric power being supplied.

In an aspect of the present invention, the controller determines the predicted value $B(T)$ for the amount of electric power stored in the storage battery at time T on the basis of the following formula:

$$B(T)=B(0)+\int(g(t)-c(t))dt$$

where $g(t)$ is the amount of electric power generated by the renewable energy, and $c(t)$ is the amount of electric power consumed by the device.

Therefore, in an aspect of the present invention, the predicted value $B(T)$ for the amount of electric power stored in the storage battery at time T can be predicted and stable power can be supplied to the data center in the future.

In an aspect of the present invention, the controller switches the operating mode of the device to the power saving mode at time T1 at which the predicted value $B(T)$ for the amount of electric power stored in the storage battery is lower than predetermined threshold value Bth.

Therefore, in an aspect of the present invention, the operation of the device can be maintained at a minimum level to wait for an increase in the amount of generated power stored in the storage battery when the amount of electric power stored in the storage battery is low.

In an aspect of the present invention, the controller determines the predicted value $g(t)$ for the amount of electric power generated using renewable energy on the basis of weather forecast data at time t when the amount of electric power generated using renewable energy changes in response to weather conditions in the region including the location of power generation.

Therefore, in an aspect of the present invention, power can be supplied stably and continuously to the data center based on a prediction of the amount of electric power stored in the storage battery even when the amount of electric power generated changes due to weather conditions.

In an aspect of the present invention, the electric power generated using renewable energy is supplied by solar power and/or wind power.

Therefore, in an aspect of the present invention, power can be supplied stably and continuously to the data center based on a prediction of the amount of electric power stored in the storage battery even when the amount of wind or solar power generated changes due to weather conditions.

One aspect of the present invention is a method for distributing a load between data centers. In this method, each data center is connected to enable communication and is operable using electric power based only on renewable energy, and includes at least one server driven by electric power, and a storage battery for storing the electric power. In this method, at least one server at a data center executes the method, which includes the steps of: acquiring a predicted value for the amount of electric power stored in the storage battery at each data center; and assigning servers to execute jobs to be processed by each of the servers at the data center in response to the predicted value for the amount of stored power.

Therefore, in an aspect of the present invention, jobs to be processed can be assigned in a flexible and timely manner to data centers operable using only electric power based on renewable energy in response to the predicted values for the amount of electric power stored in the storage batteries at the data centers.

In an aspect of the present invention, the step of assigning servers also includes the step of assigning servers to execute jobs in descending order from servers at the data center with the highest predicted value for the amount of stored power. Also, when jobs are assigned to servers, jobs are assigned to servers at data centers with a predicted value for the amount of electric power stored that exceeds a predetermined threshold value.

Therefore, in an aspect of the present invention, servers with a sufficient supply of power can be selected and jobs to be processed can be performed stably and reliably.

In an aspect of the present invention, the step of assigning servers also includes the step of switching the operating mode of servers and/or other devices to power saving mode at a data center, if the predicted value for the amount of electric power stored is lower than a predetermined threshold value.

Therefore, in an aspect of the present invention, the operation of servers and device can be maintained at a minimum level to wait for an increase in the amount of generated power stored in the storage battery when the amount of electric power stored in the storage battery is low.

In an aspect of the present invention, the predicted value $B(T)$ for the amount of electric power stored in the storage battery at time T is determined on the basis of the following formula:

$$B(T)=B(0)+\int(g(t)-c(t))dt$$

where $g(t)$ is the amount of electric power generated by the renewable energy, and $c(t)$ is the amount of electric power consumed by the device.

Therefore, in an aspect of the present invention, the predicted value $B(T)$ for the amount of electric power stored in the storage battery at time T can be predicted and stable power can be supplied to the data center in the future.

In an aspect of the present invention, the step of assigning servers also includes the step of assigning a job to a server at another data center from a server having at time T1 a predicted value $B(T)$ for the amount of electric power stored in the storage battery that is lower than predetermined threshold value $B_{th}$.

Therefore, in an aspect of the present invention, at a time at which lower levels of power stored in storage batteries is predicted, jobs to be processed can be stably and continuously processed by servers at other data centers with a high level of power stored in their storage batteries.

In an aspect of the present invention, the predicted value $g(t)$ for the amount of electric power generated using renewable energy is determined on the basis of weather forecast data at time t when the amount of electric power generated using renewable energy changes in response to weather conditions in the region including the location of power generation.

Therefore, in an aspect of the present invention, jobs to be processed can be assigned to the appropriate data center based on a prediction of the amount of electric power stored in the storage battery even when the amount of electric power generated changes due to weather conditions.

In an aspect of the present invention, the electric power generated using renewable energy is supplied by solar power and/or wind power.

Therefore, in an aspect of the present invention, jobs can be assigned to the appropriate data center based on a prediction of the amount of electric power stored in the storage battery even when the amount of wind or solar power generated changes due to weather conditions.

In an aspect of the present invention, the step of assigning servers also includes the step of selecting a data center for a job assignment on the basis of the regional time difference between data centers when the electric power generated using renewable energy is supplied by solar power.

Therefore, in an aspect of the present invention, time differences can be taken into account to select data centers in regions where power is being generated photovoltaically, and assign jobs to be processed to servers at these data centers on a rolling basis. As a result, jobs can be stably executed and monitored over a twenty-four hour period.

DETAILED DESCRIPTION

Figure 1:
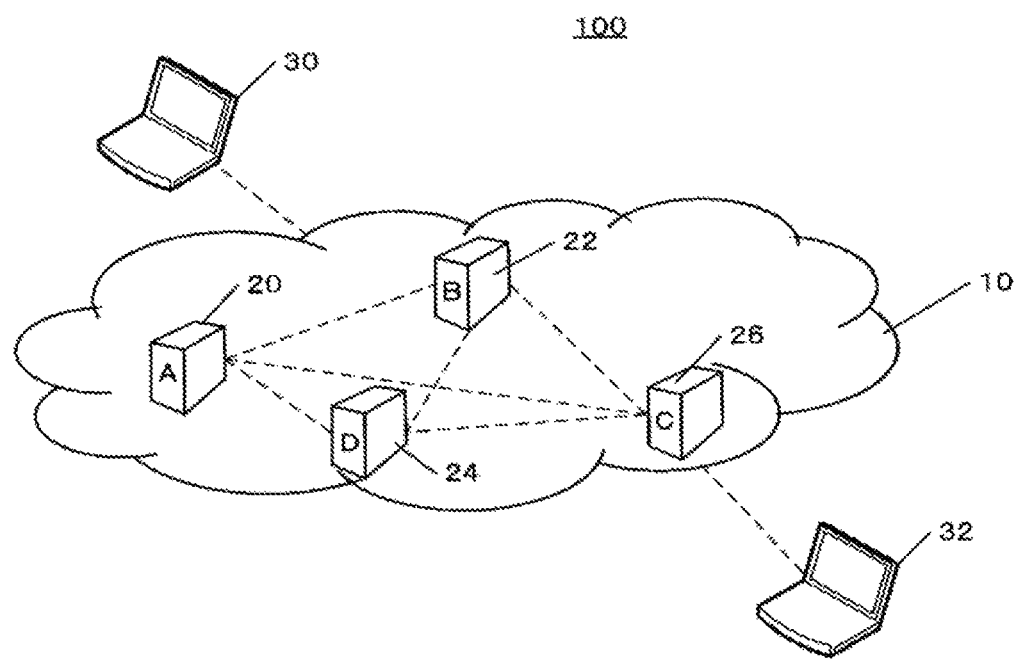
FIG. 1 is a diagram showing a configuration example of a data center network system according to an embodiment of the present invention.

The following is an explanation of an embodiment of the present invention with reference to the drawings. FIG. 1 is a diagram showing a configuration example of a data center network system according to an embodiment of the present invention. The network system 100 includes a communication network 10, four data centers (A-D) 20-26 in the communication network 10, and computers (terminals) 30, 32 that can be connected to the communication network 10. Each data center computer can communicate with other data centers and computers (terminals). The communication paths in FIG. 1 are denoted by the dotted lines. These communication paths can be wired or wireless communication paths. The number of data centers and terminals shown in FIG. 1 is just an example, and the scale of the network system can be increased or decreased.

Figure 2:
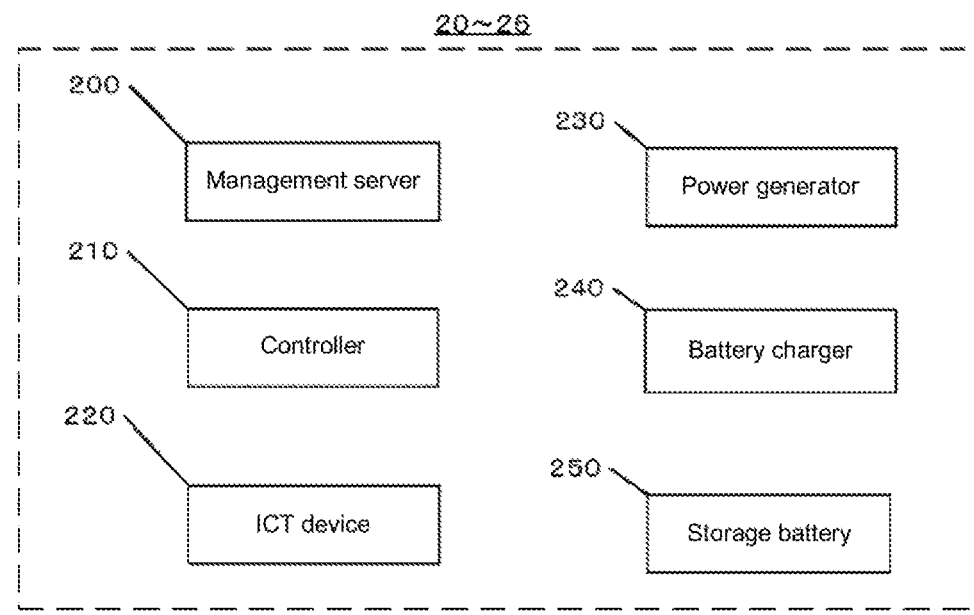
FIG. 2 is a diagram showing a configuration example of a single data center according to an embodiment of the present invention.

FIG. 2 is a diagram showing a configuration example of one of the data centers 20-26 in FIG. 1. Each data center includes a management server 200, a controller 210, an ICT device 220, a power generator 230, a battery charger 240, and a storage battery 250. The management server 200 can be any type of server, such as a web server or DNS server. In the following explanation, the management server is sometimes referred to simply as the "server." The load on the management server 200 (power consumption, jobs) is monitored, and data is sent to the controller 210. The controller 210 includes control functions for executing the method of an embodiment of the present invention, and can constitute some of the functions performed by the management server 200. The control functions of the controller 210 include server load balancing for distributing the load between servers, and so-called web switching. The control functions of the controller 210 are described below.

The ICT device 220 is used for processing information and for communication. This may include a computer device such as a server, and a storage device (such as an HDD) or tape drive. In an embodiment of the present invention, lighting and air conditioning equipment are also included. The load on the ICT device 220 (power consumption, etc.) is monitored, and data is sent to the controller 210. The power generator 230 is a device or system installed at each data center. In an embodiment of the present embodiment, it includes a power generating system using renewable or natural energy such as solar power and/or wind power. The power generator 230 includes a function (sensors, etc.) for monitoring fluctuations in the amount of electric power being generated over time, and sending data related to the amount of electric power being generated to the controller 210. The controller 210 is configured to receive weather forecast data in order to predict the amount of electric power that will be generated by the power generating system using renewable energy.

The battery charger 240 charges the storage battery used by the server, the ICT device, and the other devices with electric power from the power generator 230. The storage battery 250 stores power generated by the power generator 230, and supplies stored power to the server, the ICT device, and the other devices. The capacity of the storage battery 250 enables the server, the ICT device, and the other devices to operate for a predetermined amount of time using only its capacity (maximum power storage capacity). The storage battery 250 includes a function for monitoring the level of stored power (using sensors, etc.), and sending data on the level of stored power to the controller 210. In FIG. 2, the battery charger 240 and the storage battery 250 are separate units. However, an all-in-one charger/storage device can also be used.

Figure 3:
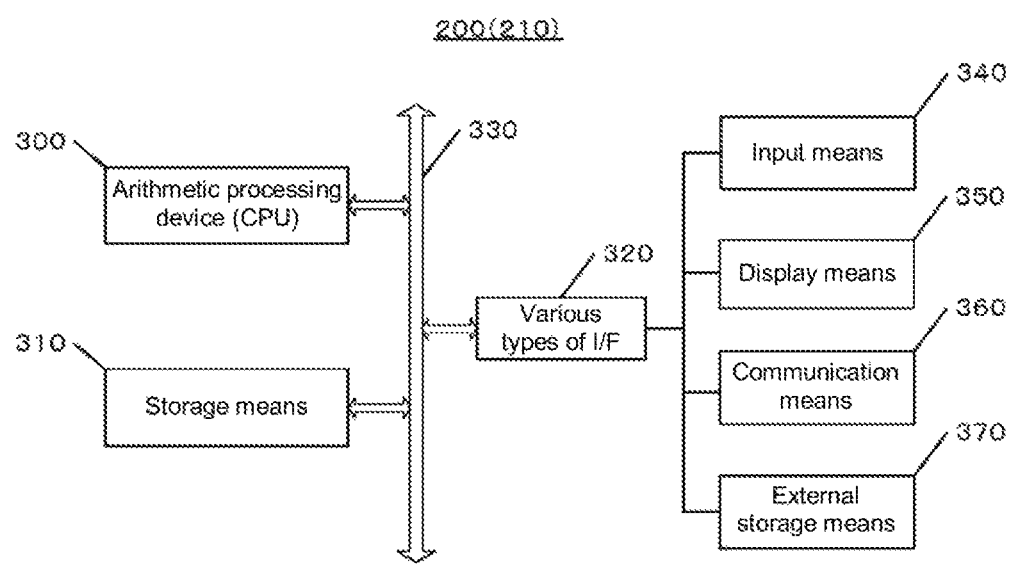
FIG. 3 is a diagram showing a configuration example of a management server according to an embodiment of the present invention.

FIG. 3 is a block diagram showing a configuration example of the server 200 in an embodiment of the present invention. The server in FIG. 3 is a host (main computer). The computer includes an arithmetic processing device (CPU) 300, a storage means 310, and various types of interfaces (I/F) 320 connected to each other via a bus 330. Types of interfaces 320 generally include input interfaces, output interfaces, external storage interfaces, and external communication interfaces. These interfaces are connected, for example, to an input means 340 such as a keyboard and mouse, a display means 350 such as a CRT or LCD, communication means 360, and an external storage means 370 such as a USB-connected semiconductor memory or HDD. The storage means 310 can include semiconductor memory such as a RAM and ROM, and an HDD.

Figure 4:
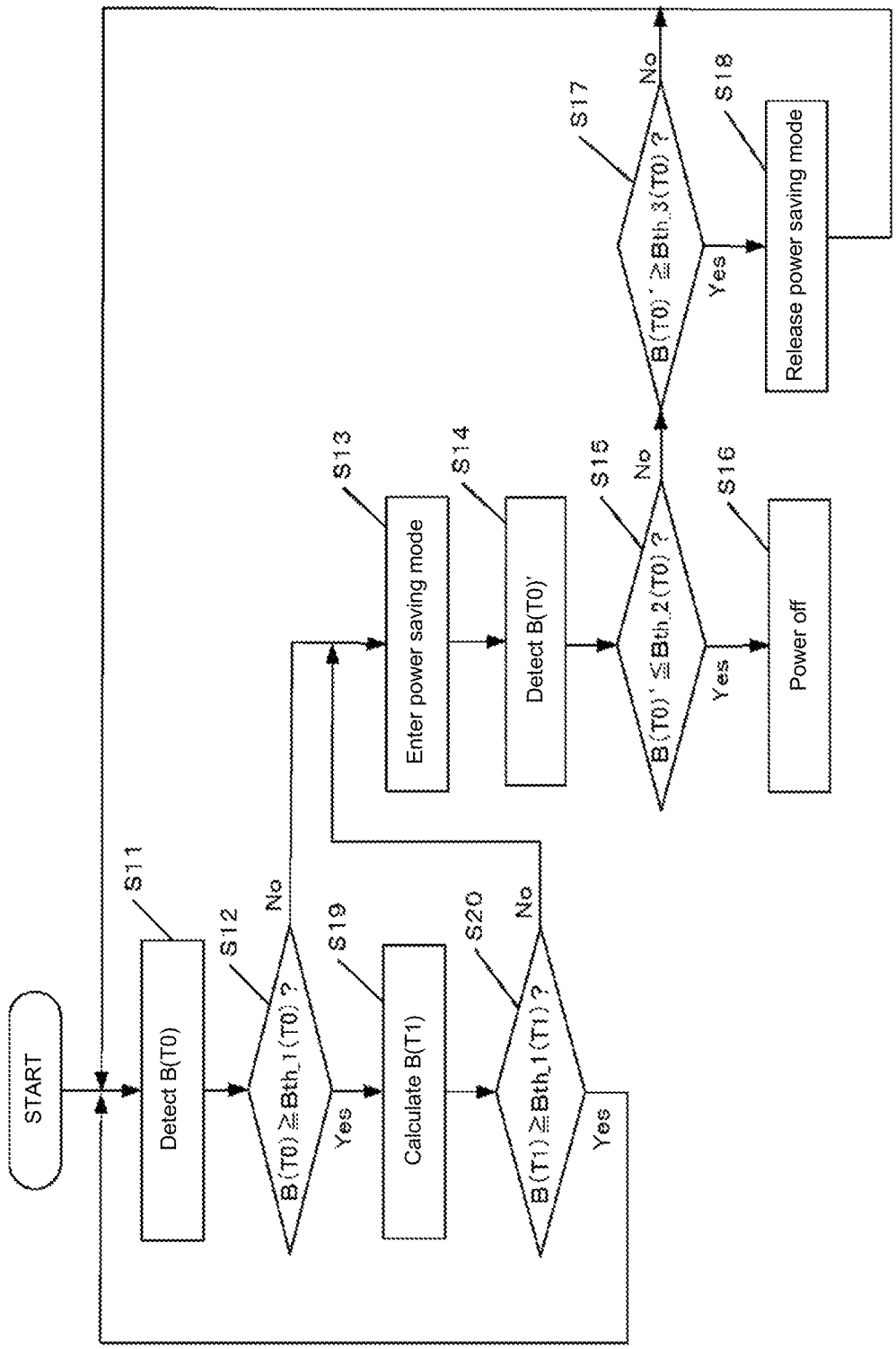
FIG. 4 is a diagram showing the operational flow in a method according to an embodiment of the present invention.
Figure 5:
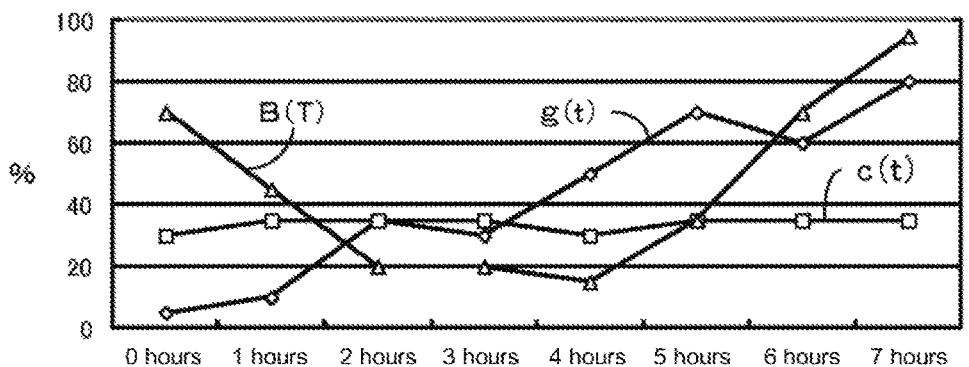
FIG. 5 is a diagram showing an example of predictions such as the amount of stored power according to an embodiment of the present invention.
Figure 6:
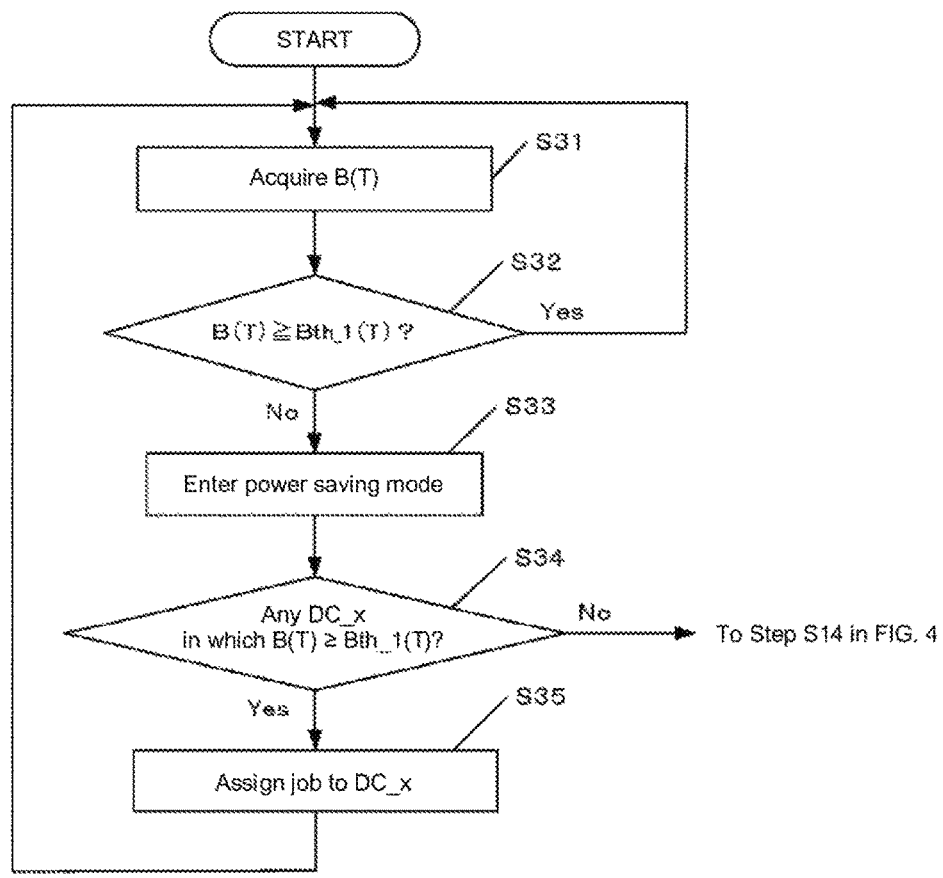
FIG. 6 is a diagram showing the operational flow in a method according to an embodiment of the present invention.
Figure 7:
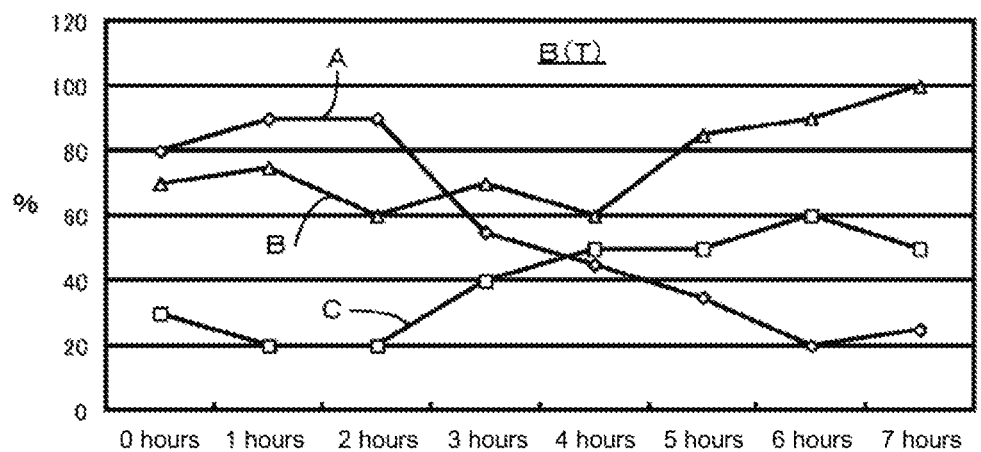
FIG. 7 is a diagram showing an example of predicting the amount of stored power according to an embodiment of the present invention.

The following is an explanation of an embodiment of the present invention with reference to FIG. 4 through FIG. 6. FIG. 4 and FIG. 6 are diagrams showing the operational flow in the method of an embodiment of the present invention. FIG. 5 and FIG. 7 are diagrams showing examples of prediction graphs for the amount of electric power stored in the storage battery of an embodiment of the present invention. The operational flow in FIG. 4 and FIG. 6 can be executed by the controller 210 in the configuration shown in FIG. 2 and can be one of the control functions of the controller 210 in a data center.

In Step S11 of FIG. 4, the current power level B(T0) of the storage battery 250 is detected (monitored). In Step S12, it is determined whether or not the current power level B(T0) is equal to or greater than a predetermined threshold value Bth_1(T0). If NO, the operating mode of the ICT device in the data center is switched to conservation (power saving) mode in Step S13. In this way, the rate of decline in the amount of electric power stored in the storage battery 250 can be slowed.

In Step S14, the current power level B(T0)' of the storage battery is again detected (monitored) after a predetermined amount of time has elapsed (for example, 5 to 10 minutes). In Step S15, it is determined whether or not the current power level B(T0)' is less than or equal to a predetermined threshold value Bth_2(T0). If YES, the ICT device in the data center is turned off in Step S16. In this way, the decline in the amount of electric power stored in the storage battery 250 is reduced to zero. When the determination in Step S15 is NO, it is determined in Step S17 whether or not the current power level B(T0)' is equal to or greater than a predetermined threshold value Bth_3(T0). If YES, the ICT device is released from conservation (power saving) mode and switched to normal operating mode in Step S18.

When the determination in Step S12 is YES, the level of stored power B(T1) in the storage battery 250 is calculated in Step S19 after a predetermined period of time T1 has elapsed (for example, 1 or 2 hours). The level of stored power B(T1) is calculated as a single predicted value. The calculation is performed using Equation (1) below.

$$B(T1) = B(T0) + \int_{T0}^{T1} [g(t)dt - c(t)]dt \qquad (1)$$

where:
B(T1): Amount of electric power stored in the storage battery at time T1
B(T0): Amount of electric power stored in the storage battery at time T0
g(t): Power generated by the power generator
c(t): Power consumed by devices, etc. at the data center.

In Equation (1), B(T0) is the value calculated in Step S11. Also, c(t) is determined as the predicted value for the amount of electric power consumed by devices, etc. at given time t between times T0 and T1. Similarly, g(t) is determined as the predicted value for the amount of electric power generated by the power generator at given time t between times T0 and T1. When the power generator is a power generating system using renewable energy such as solar power or wind power, the amount of electric power generated changes depending on the weather conditions in the region including the location of the power generator. Therefore, a simulation is run based on weather forecast information to determine the amount of electric power generated at the location or in the region of the power generator.

FIG. 5 is an example graph showing the change in predicted values c(t), g(t) and B(t) every hour from time T0 (0 hours) to time T1 after 7 hours. Each predicted value is a percentage (%), with the minimum value being 0%, and the maximum value being 100%. In FIG. 5, the amount of stored power B(t) declines sharply over the first two hours, and continues to decline until four hours has passed. However, because the amount of electric power c(t) consumed by the devices, etc. remains fairly constant, the amount of stored power B(t) can be predicted to recover (increase) after four hours as the amount of electric power generated g(t) increases.

Returning to FIG. 4, it is determined in Step S20 whether or not the calculated amount of stored power B(T1) is equal to or greater than a predetermined threshold value Bth_1 (T1). If NO, the operating mode of the ICT device in the data center is switched to conservation (power saving) mode in Step S13. Afterwards, Step S14 and the subsequent steps described above are executed.

Threshold value Bth_1(T0) in Step S12, threshold value Bth_2(T0) in Step S15, threshold value Bth_3(T0) in Step S17, and threshold value Bth_1(T1) in Step S20 of FIG. 4 are established in accordance with a prediction graph created for each data center such as the one shown in FIG. 5 so that power can be supplied stably from the amount of electric power stored in the storage battery without having to turn off any of the devices if at all possible. In the example prediction graph shown in FIG. 5, threshold value Bth_1(T0) can be set to 40%, threshold value Bth_2(T0) to 10%, threshold value Bth_3(T0) to 60%, and threshold value Bth_1(T1) to 40%.

FIG. 6 is a diagram showing the operational flow in an embodiment of a method of an embodiment of the present invention for distributing the load among data centers. In Step S31 of FIG. 6, the amount of stored power B(T) in a data center at current or future time T is acquired. The amount of stored power B(T) at future time T is obtained as a prediction value calculated using Equation (1) above. At this time, the amount of stored power B(T) at other data centers is acquired in the same manner, and the information is collected at a single data center.

In Step S32, it is determined whether or not the amount of stored power B(T) is equal to or greater than a predetermined threshold value Bth_1(T). If NO, the operating mode of the ICT device in the data center is switched to conservation (power saving) mode in Step S33. Next, in Step S34, it is determined whether or not any of the other data centers is a data center DC_x with an amount of stored power B(T) equal to or greater than threshold value Bth_1(T). If NO, the process advances to Step S14 in FIG. 4 and this step and subsequent steps are executed.

When the determination in Step S34 is YES, it is determined in Step S35 whether or not data center DC_x is to be assigned as the data center to execute a job to be processed at time T. In other words, the job is to be executed by a server in data center DC_x at time T. When, as a result of the determination performed in Step S34, two or more data centers DC_x are potential candidates, the data centers are assigned in descending order from the data center with the highest predicted value for the amount of stored power B(T).

FIG. 7 is a diagram showing an example of predicting the amount of stored power B(T) at three data centers A, B, C. Data centers A, B and C can correspond to data centers A, B and C in the communication network 10 shown in FIG. 1. FIG. 7 shows the predicted value (%) for the amount of stored power B(T) per hour from time T0 (0 hours) to time T1, which is seven hours later.

In FIG. 7, when threshold value Bth_1(T) is, for example, 40%, the predicted value for the amount of stored power B(T) at data center C is below threshold value Bth_1(T) for the first three hours. Therefore, jobs that should be processed by a server at data center C are processed instead by servers at data center A or data center B which have a predicted value for the amount of stored power B(T) that is equal to or greater than the threshold value Bth_1(T). At this time, data center A is selected as the first data center to perform the processing because it has the higher predicted value for the amount of stored power B(T).

In FIG. 7, the predicted value for the amount of stored power B(T) at data center A declines after four hours and falls below the threshold value Bth_1(T) of 40%. Therefore, jobs that should be processed by a server at data center A are processed instead by servers at data center B or data center C which have a predicted value for the amount of stored power B(T) that is equal to or greater than the threshold value Bth_1(T).

When data centers A-C are selected (assigned) in this manner, data centers that are supplied power from renewable energy such as solar power can be selected for assignment while taking into account regional time differences between data centers. When there are four data centers as in the example shown in FIG. 1, data centers using solar power can be selected in the order A→C→B→D during daylight hours at the various locations, and servers to process jobs can be selected according to the time difference. In this way, jobs can be stably executed and monitored over a twenty-four hour period.

In this way, a method of an embodiment of the present invention is able to predict the level of stored power B(T) at each data center, and select the data center with the highest level of stored power B(T) for job assignment. As a result, the stable and continuous execution of jobs can be ensured even by data centers operated exclusively by power generating systems using renewable energy such as solar power and wind power.

The operational flow shown in FIG. 6 can be executed by a server load balancer (SLB, GSLB) used to distribute the load among servers. In an explanation using the configuration shown in FIG. 1 and FIG. 2, the server 200 is a DNS server and performs the following process. In this example, the level of stored power at data center C is the highest.

(1) Clients (terminals 30, 32) query the DNS server at data center A for a domain name.
(2) The DNS server at data center A passes on the query to a DNS server at Company X (data center B).
(3) The DNS server at Company X returns a virtual IP (VIP) address at data center C to the DNS server at data center A in accordance with a GLSB algorithm.
(4) The clients (terminals 30, 32) access the VIP address at data center C.

The present invention was explained above using an embodiment, but the technical scope of the present invention is not limited to the embodiment described above. The possibility of many modifications and improvements to this embodiment should be apparent to those skilled in the art, and any embodiments including these modifications and improvements are within the technical scope of the present invention.

What is claimed is:
1. A data center, comprising:
at least one power generator configured to generate electric power from renewable energy, wherein the data center operates using only the electric power generated from the renewable energy;
at least one device driven by the electric power generated from the renewable energy;
a storage battery configured to store the electric power generated from the renewable energy; and
a controller configured to:
determine a value B(T0) for an amount of the electric power stored in the storage battery at a time T0;

predict a value c(t) for an amount of the electric power generated from the renewable energy consumed by the at least one device over a time t between the time T0 and a time T1;

predict a value g(t) for an amount of the electric power generated from the renewable energy over the time t;

predict a value B(T1) for an amount of the electric power stored in the storage battery at the time T1 based on B(T0), c(t), and g(t); and switch an operating mode of the device based on the predicted value B(T1).

2. The data center according to claim 1, wherein the controller determines the predicted value B(T1) using a formula: $B(T1)=B(T0)+\int(g(t) c(t))dt$.

3. The data center according to claim 2, wherein the controller switches the operating mode of the device to a power saving mode at the time T1 in response to the predicted value B(T1) being lower than a predetermined threshold value Bth.

4. The data center according to claim 2, wherein the controller determines the predicted value g(t) based on weather forecast data for the time t.

5. The data center according to claim 4, wherein the renewable energy is supplied by solar power and/or wind power.

* * * * *